Oct. 23, 1956  A. ARNEJO  2,768,283
MOUNTING FOR VEHICLE HEADLIGHTS
Filed June 12, 1953  2 Sheets-Sheet 2
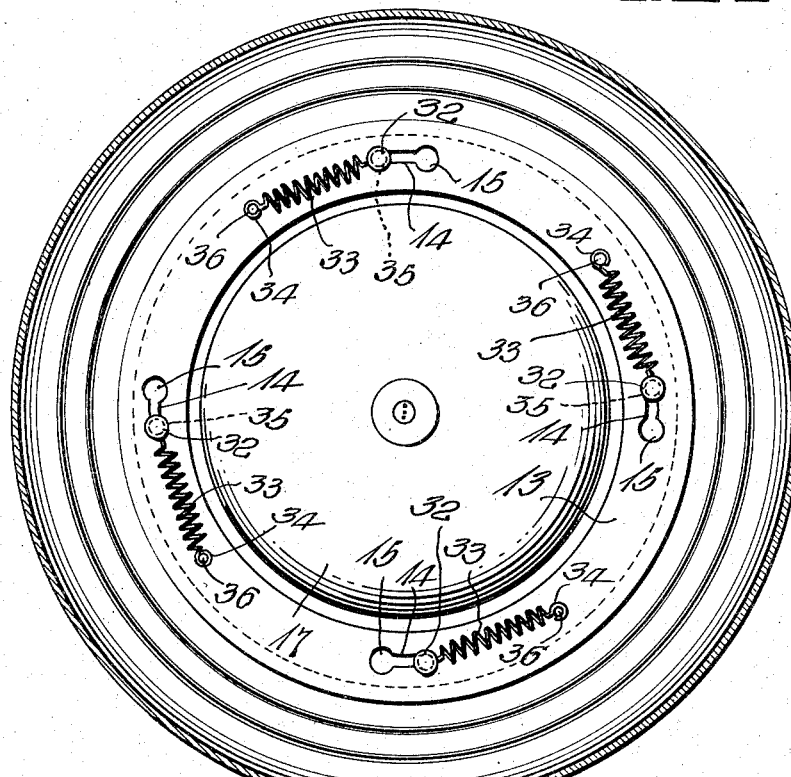
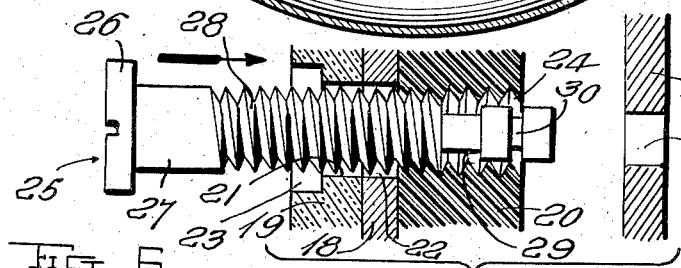
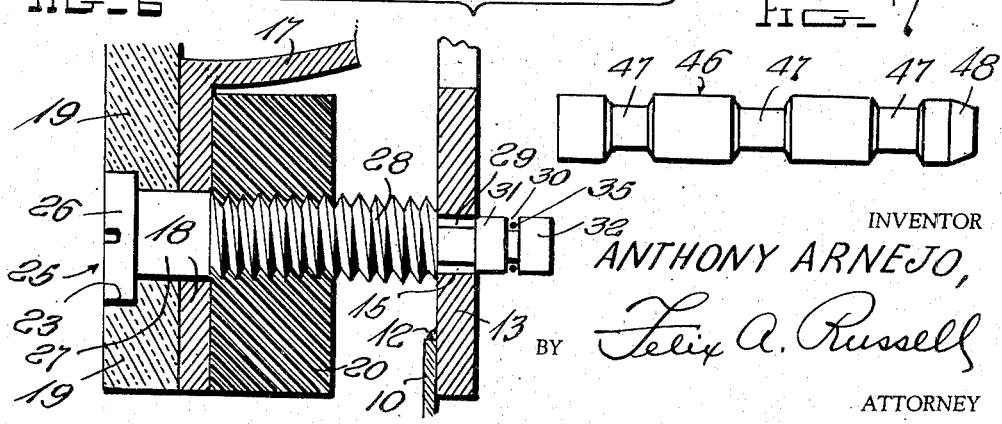
INVENTOR
ANTHONY ARNEJO,
BY Felix A. Russell
ATTORNEY

United States Patent Office 2,768,283
Patented Oct. 23, 1956

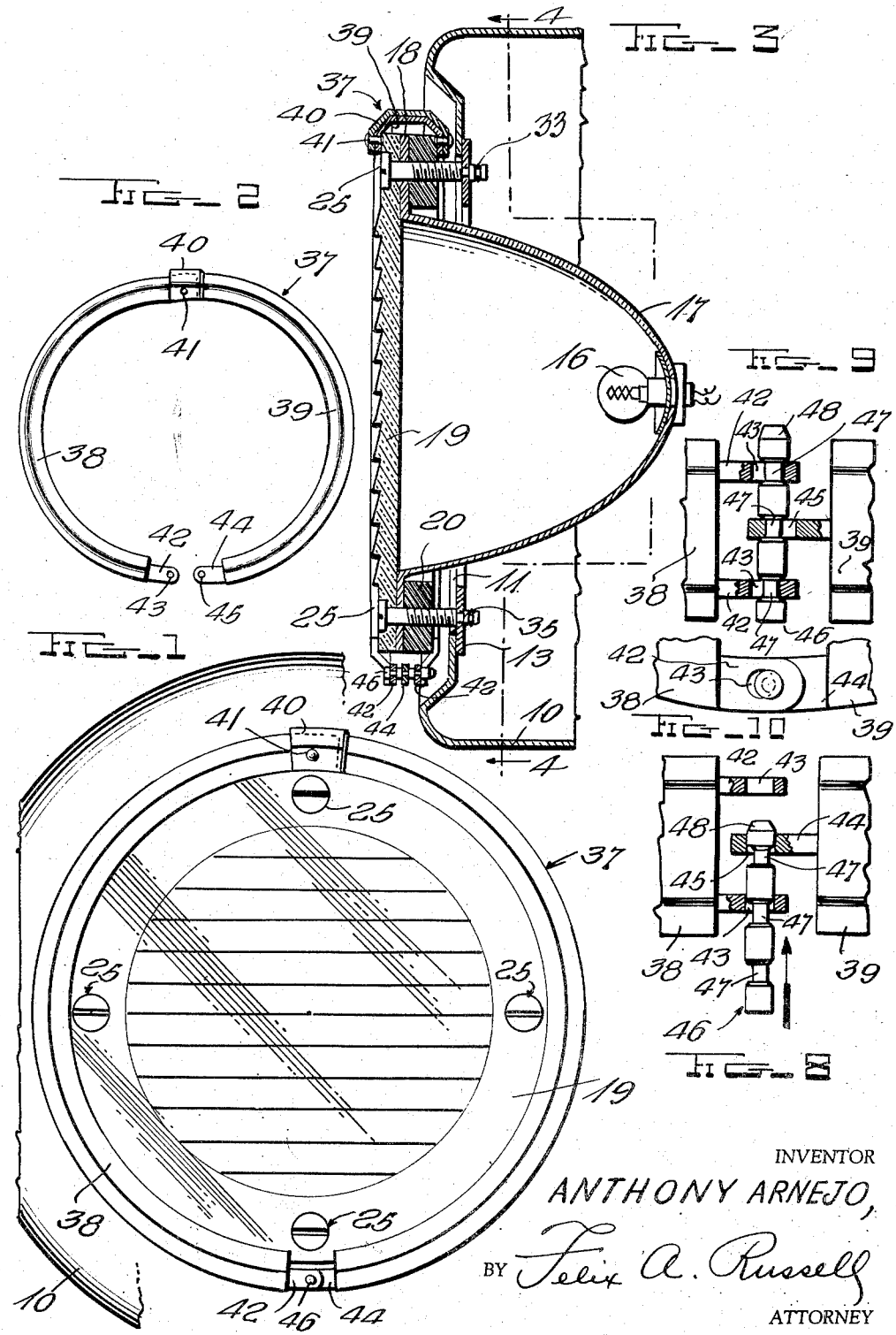

2,768,283

MOUNTING FOR VEHICLE HEADLIGHTS

Anthony Arnejo, Detroit, Mich.

Application June 12, 1953, Serial No. 361,180

2 Claims. (Cl. 240—41.5)

The present invention relates to an automobile headlight structure and it consists in the combinations, constructions and arrangements of parts herein described and claimed.

Generally there is provided an automobile headlight structure having novel means for its quick assembly and speedy mounting upon an automobile. The device includes many novel features which will be brought out in the appended specification.

It is an object of the invention to provide, in a device of the character set forth, novel fastening means for an ornamental retainer ring forming a part of the invention.

Another object of the invention is to provide, in a device of the character set forth, novel means for interconnecting a headlight lens, a headlight reflector, a plastic ring and a mooring plate, all forming parts of the invention.

Still another object of the invention is the provision of a novel screw element forming a part of the invention.

A still further object of the invention is the provision of a device of the character set forth having novel means for its quick assembly and mounting upon an automobile.

Another object of the invention is the provision of a device of the character set forth which is simple in construction, relatively inexpensive to manufacture and yet effective and efficient in use.

Other and further objects of the invention will become apparent from a reading of the following specification taken in conjunction with the drawings, in which:

Figure 1 is a front elevational view, partly broken away, of an embodiment of the invention, Figure 2 is a reduced front elevational view of an ornamental retainer ring forming a part of the invention showing the same in opened condition, Figure 3 is a vertical sectional view of the device illustrated in Figure 1, Figure 4 is a sectional view taken along line 4—4 of Figure 3, Figure 5 is a side elevational view of a mounting screw forming a part of the invention shown partially extending through certain elements to be interconnected thereby, such elements being shown in section, Figure 6 is a view similar to Figure 5 but showing the device in fully mounted position, Figure 7 is a side elevational view of a connecting pin forming a part of the invention, Figure 8 is a fragmentary plan view, partly broken away, illustrating the device shown in Figure 7 extending partially through certain connecting ears also forming a part of the invention, Figure 9 is a view similar to Figure 8 but showing the pin extended into its fully operative position, and Figure 10 is an end elevational view of Figure 9.

Referring more particularly to the drawings, there is shown therein an automobile fender 10 having a headlight-receiving opening 11 therein to the rear peripheral edge portion of which is affixed as by welding 12 a mooring plate 13 in the form of an annular ring. If desired, the mooring plate 13 may be formed integrally with the fender 10 or may be affixed thereto by brackets or in any other suitable manner.

The mooring plate 13 is provided with four circumferentially spaced arcuate slots 14 which extend circumferentially in the ring 13 and each of which is provided at one end with an enlarged circular opening 15.

A lamp 16 is mounted in suitable manner in the inner end of a reflector 17 having an outwardly extending annular flange 18. Bearing against the outer face of the flange 18 and of equal diameter thereto is a lens 19, while bearing against the inner face of the flange 18 is an annular ring 20 of plastic material. Extending through the lens 19 are four circumferentially positioned openings 21 adapted to register with four like openings 22 in the flange 18. Each of the openings 21 is provided with an enlarged portion 23 at its outer end. The plastic ring 20 is provided with four threaded openings 24 which likewise register with the opening 21 and the opening 22.

A mounting screw is generally indicated at 25 and is provided at its outer end with a head 26 adapted to closely fit within the enlarged portion 23, a cylindrical shank having an unthreaded portion 27 adjacent the head 26 and a threaded portion 28 outwardly adjacent the portion 27. An end portion of the shank 27 remote from the head 26 is reduced and provided with a relatively large groove 29 and a relatively smaller groove 30 dividing the same into a pair of cylindrical blocks 31 and 32.

Four tension springs 33 are provided and each is equipped at one end with an eye 34 and at its other end with a hook 35, the eyes 34 being secured to pins 36 secured in circumferentially spaced relation upon the rear face of the ring 13. An ornamental retainer ring is generally indicated at 37 and consists of two substantially semi-circular portions 38 and 39. A portion 40 of one end of the member 38 being slightly enlarged as indicated in Figure 2 and being riveted, as indicated at 41, in overlapping hinged engagement with the adjacent end portion of the member 39. The free end portion of the member 38 is provided with a pair of spaced ears 42 each having a circular opening 43 therethrough while the member 39 is centrally provided with an ear 44 adapted to extend between the ears 42 and provided with a circular opening 45.

A retainer pin is generally designated at 46 and consists of a cylindrical body having three spaced grooves 47 formed therein and having a tapered inner end 48. The ring 37 is provided with a substantially convex outer face and a substantially concave inner face when viewed in cross section.

In assembling the device of the present invention, the ring 20 is placed upon the rear face of the flange 18 while the lens 19 is placed upon the front face thereof whereupon the mounting screws 25 are inserted first through the openings 21, next through the openings 22 and finally threaded through the openings 24 until the heads 26 thereof are brought into position in the enlarged portions 23 as clearly shown in Figure 6, it being apparent that the reduced portion of the screws 25 will offer no resistance when being extended through the lens 19, flange 18 and plastic ring 20. The ornamental retainer ring 37 is then placed over the peripheral portions of the lens, flange and plastic ring and the free ends thereof then brought tightly together so that the openings 43 and 45 are in alignment whereupon the retainer pin 46 is moved through the three openings 43 and 45 in the manner illustrated in Figure 8 until the grooves 47 become aligned with such openings whereupon the portions 38 and 39 of the ring 37 are allowed to assume their normal position closing the sides of the openings 43 and 45 to engage in the grooves 47 to thus securely lock the retainer ring 37 in position, as shown, for example, in Figures 1 and 3. It will be apparent that the portions 38 and 39 of the ring 37, while of proper size to encompass the lens, et cetera when the pin 46 is inserted, because of inequalities of normal manufacture, will have a tendency to move apart at the lower ends, thus causing the locking action just described. The thus assembled device may now be moved toward the mooring plate 13 to allow the reduced portions of the screws 25 to extend through the circular openings 15 in such plate. By now moving the previously assembled portions of the invention in a counterclockwise direction as viewed in Figure 4, that portion of each of the screws 25 containing the groove 29 therein will move into the remote portion of its associated slot 14, it being apparent that the adjacent portions of the screw will act to securely maintain the screws against movement whereupon the hooks 35 of the springs 33 may be engaged in the grooves 30 of their adjacent screws 25 to lock the entire device in a unitary manner to the mooring plate 13.

While but one form of the invention has been shown and described herein, it will be readily apparent to those skilled in the art that many minor modifications may be made without departing from the spirit of the invention or the scope of the appended claims.

What is claimed is:

1. A device of the character described comprising a circular mounting plate having a central opening and a plurality of circumferentially spaced circumferentially extending bayonet slots each comprising a circular opening and a slot portion, a headlight assembly including a plurality of circumferentially spaced mounting screws threadedly affixed to said assembly and extending rearwardly thereof, said mounting plate being spaced rearwardly of the points of emergence of said screws from said assembly, said screws each having a reduced rearward portion extensible through a circular opening and of greater diameter than the width of a slot portion, said reduced portion having a pair of spaced grooves therein, one of said grooved portions being receivable in a slot portion, and a plurality of tension springs each connected at one end to said mounting plate and each having a hook at its other end engageable in the other of said grooves whereby to normally urge said first-mentioned grooved portion into the slot portion of a bayonet slot.

2. A device of the character described comprising a reflector having an outwardly extending annular flange, a ring of plastic material mounted in abutting relation to the rear face of said flange and having a plurality of circumferentially spaced threaded openings therethrough, a lens mounted in abutting relation to the forward face of said flange, a mounting plate carried by a vehicle body and having a central opening adapted to receive a portion of said reflector therethrough, means for attaching as a unit said lens, flange and ring to said mounting plate, said means comprising a plurality of circumferentially spaced mounting screws extending freely through the peripheral portions of said lens and flange, threadably extending through said ring and removably attachable to said plate, an ornamental retainer ring removably mounted on the peripheral portions of said lens, flange and ring, said retainer ring formed of a pair of complementary semicircular parts hinged together at one end thereof, a pair of spaced apertured ears extending in spaced relation from the free end of one of said parts, an apertured ear extending from the free end of the other of said parts and receivable in spaced relation between said pair of ears, and a retainer pin extending through the apertures of said ears and having spaced grooves therein each adapted to receive therein a portion of an ear adjacent its respective aperture.

References Cited in the file of this patent

UNITED STATES PATENTS

| | | |
|---|---|---|
| 1,361,151 | Goetting | Dec. 7, 1920 |
| 1,928,112 | Michel | Sept. 26, 1933 |
| 1,949,821 | White et al. | Mar. 6, 1934 |
| 2,218,326 | Anklam | Oct. 15, 1940 |
| 2,268,878 | Kopp | Jan. 6, 1942 |